Figure 1:
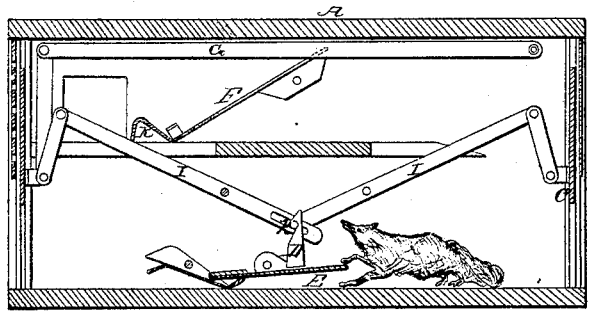
Figure 3:
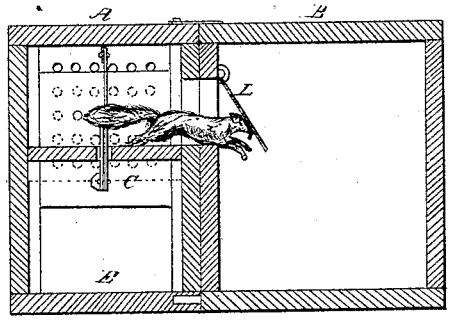
Figure 2:
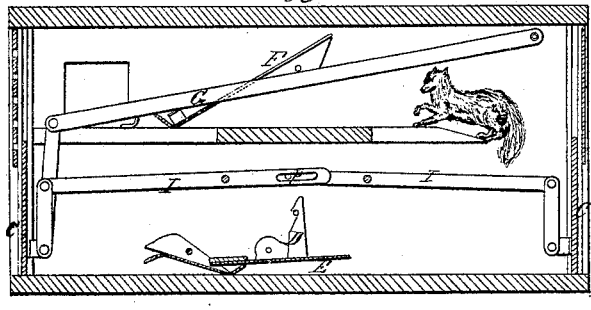
Figure 4:
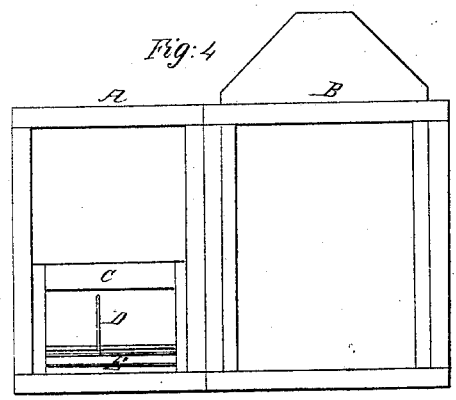
Figure 5:
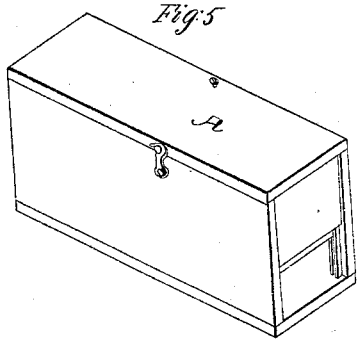
Figure 6:
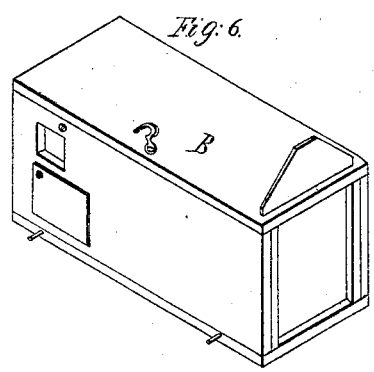

E. Hill,
Cage Trap,

N° 21,676.         Patented Oct. 5, 1858.

UNITED STATES PATENT OFFICE.

EDMUND HILL, OF CINCINNATI, OHIO.

CONSTRUCTION OF ANIMAL-TRAPS.

Specification of Letters Patent No. 21,676, dated October 5, 1858.

*To all whom it may concern:*

Be it known that I, EDMUND HILL, of Cincinnati, Hamilton county, Ohio, have invented a new and useful Improvement in Traps for Catching Animals; and I hereby declare the following to be a full, clear, and exact description of the construction and operation of the same, reference being had to the accompanying drawings, making part of this specification.

This invention relates to that class of traps, in which each animal, after resetting the trap, is caught in a box distinct from the trap proper; and it consists in the combination and arrangement of the means to insure, more fully, the resetting of the trap.

In the accompanying drawings, Figure (1) is a longitudinal section of the trap as set. Fig. (2) is a similar view as closed by the animal. Fig. (3) is a transverse section at $x$ $x$, Fig. (1). Fig. (4) is an end view, and Figs. (5), and (6), are detached perspective views of the trap and box, respectively.

The trap when set is open at both ends, as seen in Fig. (1).

(A) is the trap proper.
(B) is the receiving box.
C, C' are the doors, which, in Fig (1), are seen held open by means of trigger (D), which a fox is about to disengage, by getting on the platform (E); which act releases the trigger, and closes the trap, as seen in Fig. (2). The fox being now entrapped, and seeing a light in the upper chamber, clambers to it, as seen in Fig. (2); and rushing forward, under, and past, the falling gate, (F), thereby lifts the lever (G), and with it the doors C, C', and the trigger setting apparatus I, I.

It will be observed that unless the lever (G) is raised considerably, the pin ($p$), which connects the two levers of the trigger setting apparatus, will not be depressed sufficiently to engage the trigger (D); and to insure the sufficient elevation of this lever, and to prevent the fox from lifting the door (F) from the other side, I place a ridge or step (K), where the door (F) reaches the platform of the upper chamber. The animal, being unable to return through the gate (F,) and seeing a light in the box (B), darts through the opening, and the valve (L) closes after it.

Having thus described my invention, and the operation of the same, I claim—

The ridge or step (K), in combination with the door (F), and lever (G), for the purpose of resetting the trap.

In testimony of which invention I hereunto set my hand.

EDMUND HILL.

Attest:
GEO. H. KNIGHT,
OCT's KNIGHT.